UNITED STATES PATENT OFFICE.

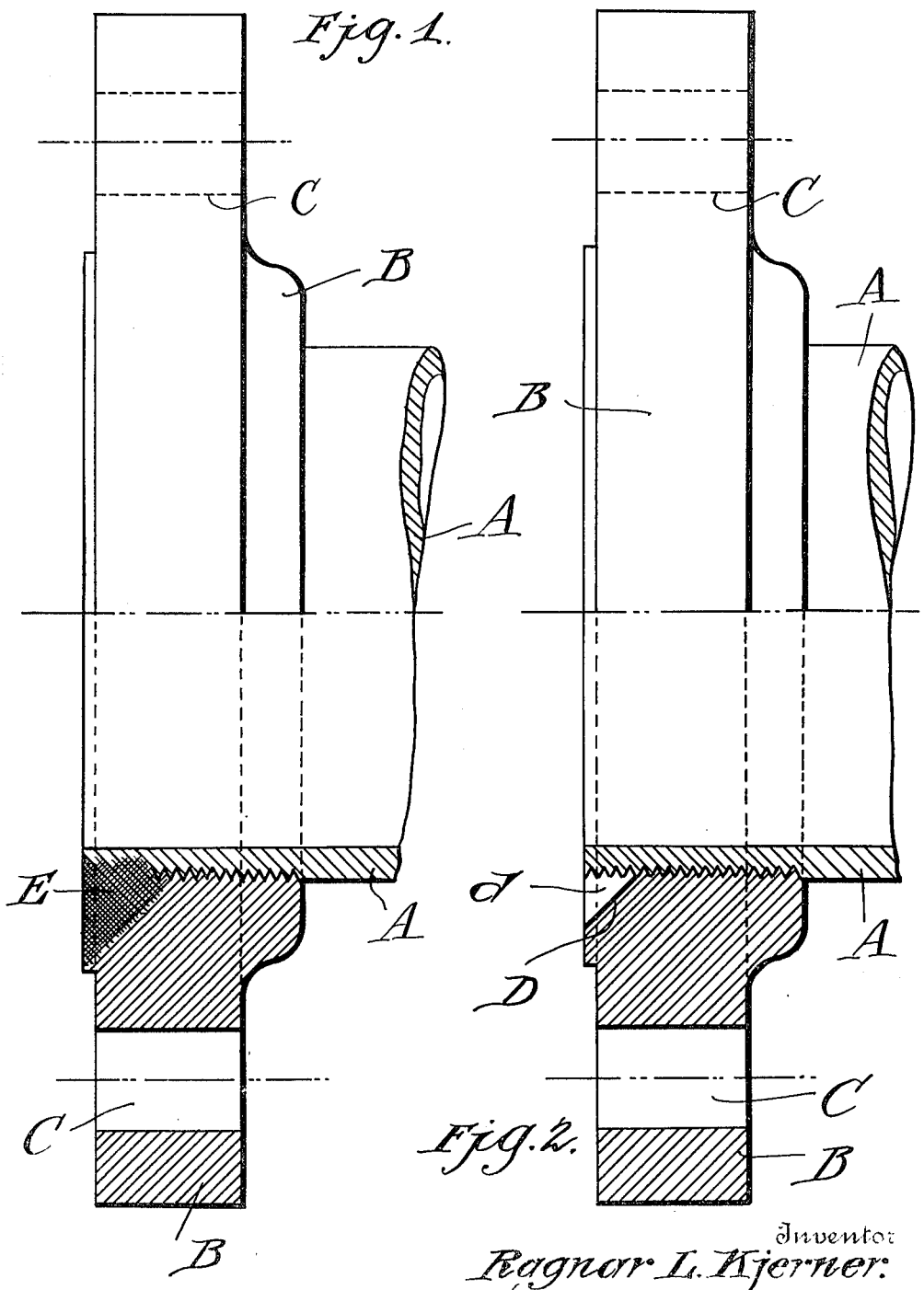

RAGNAR L. KJERNER, OF CRESTWOOD, NEW YORK.

PIPE CONNECTION.

1,291,552.  Specification of Letters Patent.  Patented Jan. 14, 1919.

Application filed April 9, 1917. Serial No. 160,633.

*To all whom it may concern:*

Be it known that I, RAGNAR L. KJERNER, a citizen of the United States, residing at Crestwood, in the county of Westchester and State of New York, have invented a certain new and useful Improved Pipe Connection, of which the following is a specification.

This invention is a pipe coupling, and, more particularly, directed to an improved construction whereby flanges may be secured to ends of pipes in a strong and durable way.

It has been the practice for many years to attach flanges to the ends of ordinary piping such, *e. g.*, as is generally used for steam conduits, to facilitate the securing of successive pipe lengths together by bolts, in such manner as to preclude leakage, and withstand the wear and tear to which such systems are frequently subjected. The flanges have been threaded directly upon the end of the pipe, but, it is found, in practice, that where connections thus constructed are employed in high pressure steam systems, and, unless said threads are practically perfect, the steam will, after a time, force its way along the channels of the threads, and cause leakage back of the coupling. This leakage is aggravated by corrosion of the threads, brought about by continued leakage, so that in a comparatively short time the efficiency of this system is greatly impaired, and a constant flow of steam and water of condensation, leaking from the various couplings, escapes into the surrounding atmosphere.

In view of the large scale on which couplings are manufactured, it is decidedly impractical to cut the threads with that nicety required for a perfect coöperation between the parts, and, unless this perfect coöperation exists, leakage is bound to ensue. Accordingly, the structure now generally employed is that wherein the holes through the flanges, which embrace the piping, are made of greater diameter than the diameter of the pipe, and are left unthreaded and smooth and the pipe ends are wiped or spun outwardly to form narrow flanges against which the adjacent faces of the main flanges of the coupling seat. When two adjacent pipe lengths, constructed as specified, are bolted together, with a gasket interposed between them, a very satisfactory joint results, as leakage between the flanges and the walls of the piping will not ordinarily result. However, the method of spinning the flanges on the pipe ends is extremely costly, and the mechanism required to accomplish this result is very expensive as many successive steps are necessary in the process. As a result of the exorbitant cost of the machinery required, and the nicety with which the operation must be carried out, there are, throughout the country, but few concerns which produce this coupling, and they monopolize the market. The retail price of piping of this character is greatly in excess of that of ordinary piping, and said flanged piping is, therefore, used only when absolutely necessary.

With the foregoing in mind, the object of this invention is to provide a pipe coupling which will effectually preclude leakage, but will, at the same time, be extremely cheap to manufacture and without requiring any appreciable amount of machinery in its production. Generally speaking, the invention contemplates the threaded coöperation between a coupling flange and a pipe for a portion of the thickness of said flange, the remaining portion of said flange being occupied by a homogeneous weld between the metal of the flange and the metal at the end of the pipe.

Features of the invention, other than those specified, will be apparent from the hereinafter detailed description, when read in conjunction with the accompanying drawings.

In the accompanying drawings, I have illustrated one practical embodiment of the invention, but the construction shown therein is to be understood as illustrative only, and not as defining the limits of the invention.

Figure 1 shows a pipe coupling embodying the present invention, one-half of the view being an elevation and the other half a central section, and Fig. 2 is a central section illustrating a partly finished coupling.

Referring to the drawings, A designates a length of piping threaded at its end, and B designates a flange interiorly threaded to screw upon the end of the pipe. The threading of the pipe and flange is, preferably, substantially straight, in contradistinction to the customary taper generally employed in pipe threads, as the tightest coöperation may be had between the parts if they are threaded with straight or with a very slight taper. The flange B is provided with the usual holes C for securing adjacent flanges of an insulation together through the medium of bolts or other devices generally employed.

The flange is chamfered as at D, the formation of said chamfer cutting away a portion of the threaded passage through the flange and that face of the flange which engages the gasket, and, accordingly, when the flange is initially screwed upon the pipe, an annular channel $d$ is left about the free end of the pipe, as clearly shown in Fig. 2.

In the manufacture of a coupling of this invention, the flange B is screwed onto the threaded pipe end to partake of the position shown in Fig. 2, and, thereafter the channel $d$ is filled with molten metal. This operation is accomplished through welding, preferably with the aid of electricity or an oxyacetylene blowpipe, operating, preferably, upon Norway or similar iron. During this operation the heat of the blowpipe is so intense as to partly fuse the chamfered face D of the flange B, and also the threads of the pipe A adjacent the channel $d$, so that the metal introduced mingles with the metal of these fused parts, and, when the weld cools, that portion of the coupling which previously was the channel $d$ becomes a solid mass of metal, homogeneous with the metal of the flange B and the pipe itself, as clearly shown in Fig. 1 at E.

The finished structure is extremely strong and impervious to leakage, both the threaded coöperation between the pipe and flange and the weld itself, precluding the flange from pulling off the pipe. In order to so disrupt the construction, it would be necessary to strip all of the threads and break the weld. Furthermore, while the threads alone might allow of leakage, the weld seals the coupling against leakage through the threads. Thus, both the threads and weld coöperate to provide an extremely strong and rigid construction adapted to absolutely preclude leakage. A marked commercial advantage resides in the fact that very little machinery is required in the manufacture of the coupling. It may be expeditiously and economically manufactured and sold at a much lower figure than the constructions of the prior art, and still be considerably superior thereto, from a structural standpoint. The present invention, thus, embodies all the requirements for a structurally efficient and practically economic coupling, adapted to withstand great pressures, and to preclude leakage between the coupling and the pipe ends by any pressure up to the pressure which the pipe itself can withstand.

In adapting the invention to various environments, slight modifications of the parts may be necessary to adapt the invention to particular uses. Thus, the construction, as illustrated, may be slightly modified without departing from the spirit of the invention. For example, the chamfer D, instead of being at the forward face of the flange, as shown, may be formed in the rear face thereof, or welds may be positioned at both the forward and rear faces of the flange. Moreover, the channel $d$ formed by chamfering the flange, as shown, may be of different cross-section, the particular V-shaped section shown being illustrative only. For these reasons, it will be understood that the invention is not restricted to the specific construction illustrated, but, is as broadly novel as is commensurate with the appended claims.

A series of operations, incident to the assembling of the construction described, constitute a novel method on which applicant purposes to file a separate application embodying such matter.

While the hereinbefore description deals with the present invention as particularly adapted for employment in conduit construction for steam systems, it will be manifest that it is not limited to this particular use and may be utilized in pressure systems, broadly, either pneumatic or hydraulic.

Having thus fully described the invention, what I claim as new and desire to secure by Letters Patent, is:

1. As a new article of manufacture, a pipe connection embodying a threaded pipe, a threaded flange screwed upon the pipe, a portion of the threads of the flange being cut away, and the cut away portion filled with metal homogeneous with the metal of the pipe and flange.

2. As a new article of manufacture, a pipe coupling embodying a pipe, a flange threaded for a part of its thickness upon the pipe, the remainder of the thickness of the flange being welded to the corresponding portion of the pipe through a metal homogeneous with the metal of the pipe and flange.

3. As a new article of manufacture, a pipe coupling embodying a pipe, a flange screwed on to the pipe, an annular depression in the face of the flange adjoining the pipe, and an insert of metal in said depression, fused to the pipe and flange respectively, whereby said pipe, flange and metal are made integral.

In testimony whereof I have signed my name to this specification.

RAGNAR L. KJERNER.